United States Patent [19]

West

[11] Patent Number: 5,358,207
[45] Date of Patent: Oct. 25, 1994

[54] AUTOMOTIVE SEAT TRACK LOCKING MECHANISM

[75] Inventor: Frank T. West, Almont, Mich.

[73] Assignee: Bertrand Faure Ltd., Mississauga, Canada

[21] Appl. No.: 183,931

[22] Filed: Jan. 21, 1994

Related U.S. Application Data

[63] Continuation of Ser. No. 983,904, Dec. 1, 1992, abandoned.

[51] Int. Cl.$^5$ ............................................. F16M 13/00
[52] U.S. Cl. .................................... 248/430; 297/311
[58] Field of Search ............ 248/429, 430, 393, 222.1, 248/424; 312/333, 349, 350, 341.1; 297/318, 344, 311

[56] References Cited

U.S. PATENT DOCUMENTS

| | | | |
|---|---|---|---|
| 4,511,187 | 4/1985 | Rees | 312/332 X |
| 4,804,229 | 2/1989 | Nishino | 248/430 X |
| 4,813,643 | 3/1989 | Nihei | 248/430 |
| 4,821,991 | 4/1989 | Aihara et al. | 248/430 |
| 4,949,932 | 8/1990 | Terai | 248/430 |
| 5,028,028 | 7/1991 | Yamada et al. | 297/344 X |
| 5,082,228 | 1/1992 | Shimazahi | 248/430 |
| 5,167,393 | 12/1992 | Hayakawa et al. | 297/344 X |

*Primary Examiner*—Alvin C. Chin-Shue
*Assistant Examiner*—Korie H. Chan
*Attorney, Agent, or Firm*—Patrick J. Hofbauer

[57] ABSTRACT

A latchable track assembly for use with a seat in a vehicle, is disclosed. The assembly comprises first and second generally U-shaped slidably engaged track members adapted for relative sliding movement with respect to each other along a first longitudinal axis. The first track member has a first row of consecutive teeth on the first track member with the first row in aligned, generally parallel relation to the first axis, the consecutive teeth defining interstices positioned one between each pair of the consecutive teeth. There is a locking member having a least one detent portion dimensioned to be positionable within at least one of the interstices in transverse intruding relation to the first row of consecutive teeth and a bracket member rigidly attached to the second track member and adapted to laterally support the locking member in juxtaposed pivotable relation to the first track member. The locking member is mounted on the bracket member such that the at least one detent portion is selectively positionable into and out of the interstices and moves into and out of the interstices in a plane substantially transverse to the first longitudinal axis by corresponding selective operation of the locking member, thereby to selectively retain the first and second track members in fixed longitudinal latched relation with respect to each other.

11 Claims, 4 Drawing Sheets

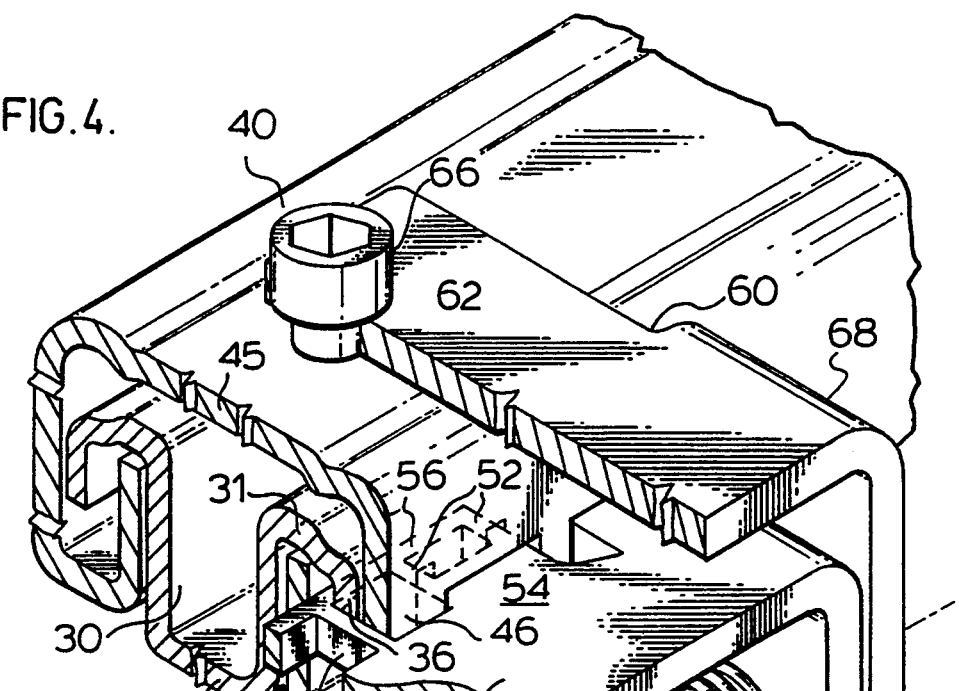
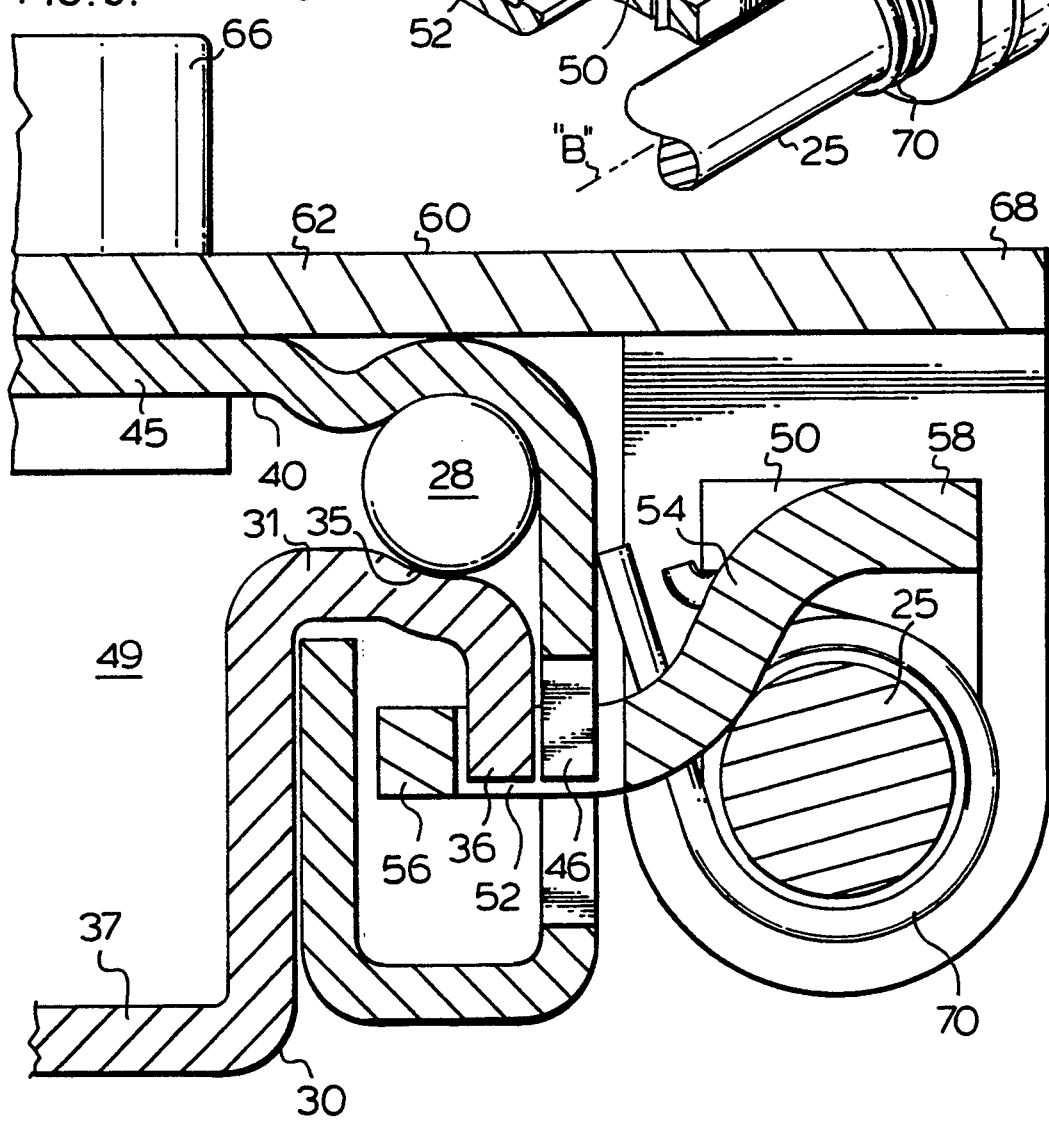

AUTOMOTIVE SEAT TRACK LOCKING MECHANISM

This is a continuation of abandoned application Ser. No. 07/983,904, filed Dec. 1, 1992.

FIELD OF THE INVENTION

The present invention relates to latchable track assemblies for use with a seat in a vehicle, and more particularly to a latching mechanism intended for use in combination with such latchable track assemblies.

BACKGROUND OF THE INVENTION

Latchable track assemblies are very widely used to retain a vehicle seat in slidably movable yet selectively positionable relation to a vehicle floor pan, such latchable track assemblies typically comprising first and second slidably engaged track members interfaced one to the other by a plurality of ball bearings, with the first track member being fixed with respect to the vehicle and the second track member being fixed with respect to the seat. An example of such a prior art latchable track assembly is shown in U.S. Pat. No. 4,863,289 (Lecerf) issued Sep. 5, 1989.

It is common in the prior art to use a latching mechanism to selectively lock the two track members from slidably moving with respect to each other. Such a latching mechanism is typically rigidly attached to the second track member, which track member is fixed to the vehicle seat, thereby to provide consistent access to a handle means by the seat occupant. The latching mechanism typically comprises a bracket member and an elongated locking lever, with the locking lever being pivotally mounted on the bracket member adjacent its midpoint. The locking lever, which includes the handle means as an integral portion at one end, is pivotally mounted as aforesaid about a generally vertical axis, and has a small row of horizontally protruding detent members, usually two or three in number, that are selectively moved by corresponding movement of the handle means in an arc about the generally vertical axis into and out of the interstices between the consecutive teeth that form a row of teeth on the first track member, thereby providing for selective locking the two track members with respect to each other.

Such prior art latch mechanisms are rather bulky in their construction, with the locking lever requiring a significant amount of available free-space for operative movement between the locked and unlocked configurations of the mechanisms. This significantly limits the design applications in which such prior art track latching assemblies can be used.

It has been found that such prior art track latching mechanisms employing a pivotally operable locking lever can only accommodate a maximum of about three detent portions and still operate smoothly and properly in terms of being positioned into and removed from the aforesaid interstices between the teeth of the first track member. This is so because the detent portions must fit in close locking relation between the teeth of the first track member, but must also travel in a radius arc when being moved into or out of the interstices, which tends to cause jamming of the detent portions in the interstices if the arc is unduly large, as where more than about three detent portions are positioned seriatim along the locking lever. It is, however, desirable to have a latching mechanism that is pivotally operable for reasons of simplicity of design, ease of use, reliability, and low manufacturing costs.

Known latching mechanisms having only three or less detent portions are known to sometimes fail, by breaking under the extreme shearing forces caused by the rapid acceleration or deceleration of a vehicle under crash or crash-like conditions. Such failure of the latching mechanism results in the vehicle seat sliding freely in the vehicle seat track assembly, which can cause undue injury to a seat occupant or to other occupants of the vehicle. Such latching mechanism failure has become more pronounced in view of the recent design trend, dictated by safety and convenience considerations, of mounting the female portion of the seat-belt harness or, indeed, both the male and female portions of the seat-belt harness, onto the vehicle seat frame. Such mounting of the seat-belt harness components means that the crash loads previously transferred by the seat-belt harness to structural components of the vehicle body are instead borne by the vehicle seat frame. Not only must the seat frame itself be made more robust to safely accommodate this increased loading, but so also must the seat track latching mechanisms. For this reason, prior art seat track latching mechanisms, and particularly those limited by their inherent geometry to three or less detent portions, have proven unsuitable for such seat-belt loading applications.

A further problem with known prior art latching mechanisms is that, where the latching mechanism becomes detached from the second track assembly, such as might happen during an impact to the bracket member holding the locking lever, there is no longer a physical interconnection between the second track member and the first track member. Resultingly, the first track member and the second track member are no longer precluded from slidably moving with respect to one another, which is, of course, dangerous to the vehicle's occupants.

Perhaps most importantly, known prior art latchable track assemblies have teeth and/or detent portions that are not enclosed by the track members at all times, and are thus exposed to the ambient vicinity of the track assembly. This potentially creates a problem in that upholstery material of the seat, carpet material of the vehicle, detritus or even stray articles under the seat, could interfere with the intended operation of the latching mechanism, thereby creating a safety hazard to the seat and vehicle occupants. Moreover, grease or other lubricant present on the track assembly and the latching mechanism can contact the vehicle carpet material etc., or the hands of the seat occupant, thereby soiling same.

SUMMARY OF THE INVENTION

It is an object of the present invention to overcome, inter alia, the shortcomings of the prior art described above by providing a latchable vehicle seat track assembly that has a locking member designed to operably accommodate a potentially unlimited number of detent portions adapted for track interlocking positioning into and out of the teeth on the first track member, thereby allowing for greater track loading than with prior art vehicle seat track locking mechanisms, such as is necessary when seat belt harness components are mounted on the vehicle seat frame.

It is a further object of the present invention to provide a latchable track assembly wherein the detent portions of the locking member are selectively positionable into and out of the interstices between the teeth of the fixed seat track member in a plane substantially transverse to the row of teeth on the fixed track member.

It is a further object of the present invention to provide a latchable track assembly having a latching mechanism with a locking member that is pivotally operable about a pivot axis that is parallel to the row of teeth on the track member, fixed with respect to the vehicle so as to provide for compact, direct action by an operator with a minimum of lost motion.

It is another object of the present invention to provide a latchable track assembly that is compact, lightweight, yet relatively more robust than previous latching track assemblies in terms of the latching mechanism not breaking when resisting extreme forces encountered during rapid acceleration or deceleration of a vehicle, such as are encountered during vehicle impacts, and thereby precluding unwanted forward or rearward slidable movement of the seat.

It is yet a further object of the present invention to provide a latchable track assembly that can remain latched in the event that the bracket member of the latching mechanism becomes detached from the track member to which it is normally affixed.

It is a further object of the present invention to provide a latchable track assembly that has teeth and detent portions that are generally enclosed by the track members of the track assembly so as to preclude interference of ambient material in the vicinity of the track assembly from interfering with the safe latching operation of the latchable track assembly, and transfer of grease or other lubricant from the latching mechanism components to such ambient material on the hands of a vehicle occupant. Moreover, such enclosure of the teeth and detent members within the track members provides for a more compact latching device which requires less operating space within the volume of the vehicle. This latter consideration is increasingly important in modern vehicle design.

There is thus provided according to the present invention a latchable track assembly for use with a seat in a vehicle. The assembly comprises first and second slidably engaged track members adapted for relative sliding movement with respect to one another along a first longitudinal axis, with the first track member having a first row of consecutive teeth positioned in aligned, generally parallel relation to the first axis. The consecutive teeth define interstices positioned one between each pair of the consecutive teeth. There is also provided a locking member having at least one detent portion dimensioned to be positionable within at least one of said interstices in transverse intruding relation to the first row of consecutive teeth, and a bracket member that is rigidly attached to the second track member and adapted to laterally support the latching member in juxtaposed relation to the first track member. The locking member is mounted on the bracket member such that the at least one detent portion is selectively moveable into and out of the interstices in a plane substantially transverse to the first longitudinal axis by corresponding selective operation of the locking member, thereby to selectively retain the first and second track members in fixed longitudinal latched relation with respect to each other.

Other objects, features and characteristics of the present invention, as well as methods of operation and functions of the related elements of the structure, and the combination of parts and economies of manufacture, will become more apparent upon consideration of the following detailed description and the appended claims with reference to the accompanying drawings, all of which form a part of this specification.

DETAILED DESCRIPTION OF A PREFERRED EMBODIMENT

Introduction to the Drawings

Figure 1:
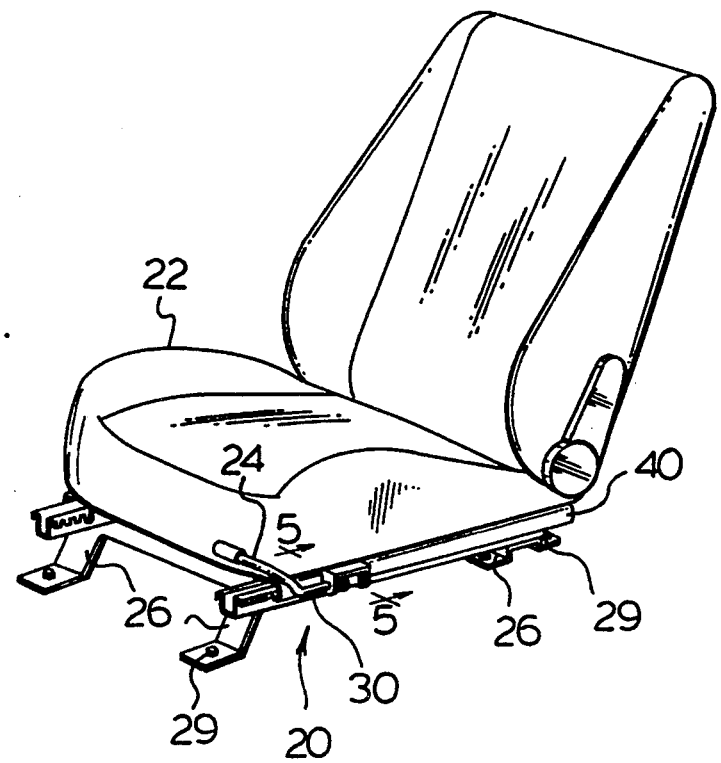
Figure 2:
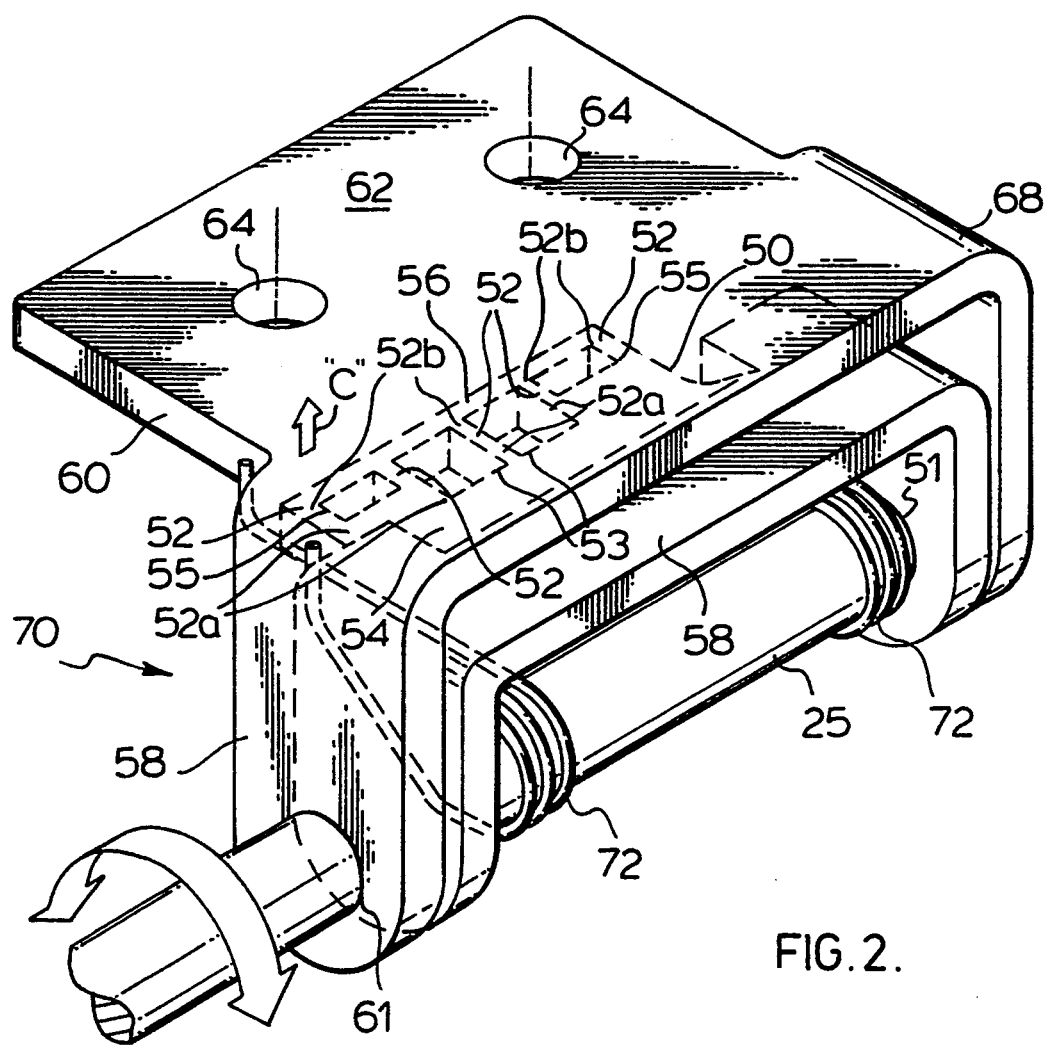
Figure 3:
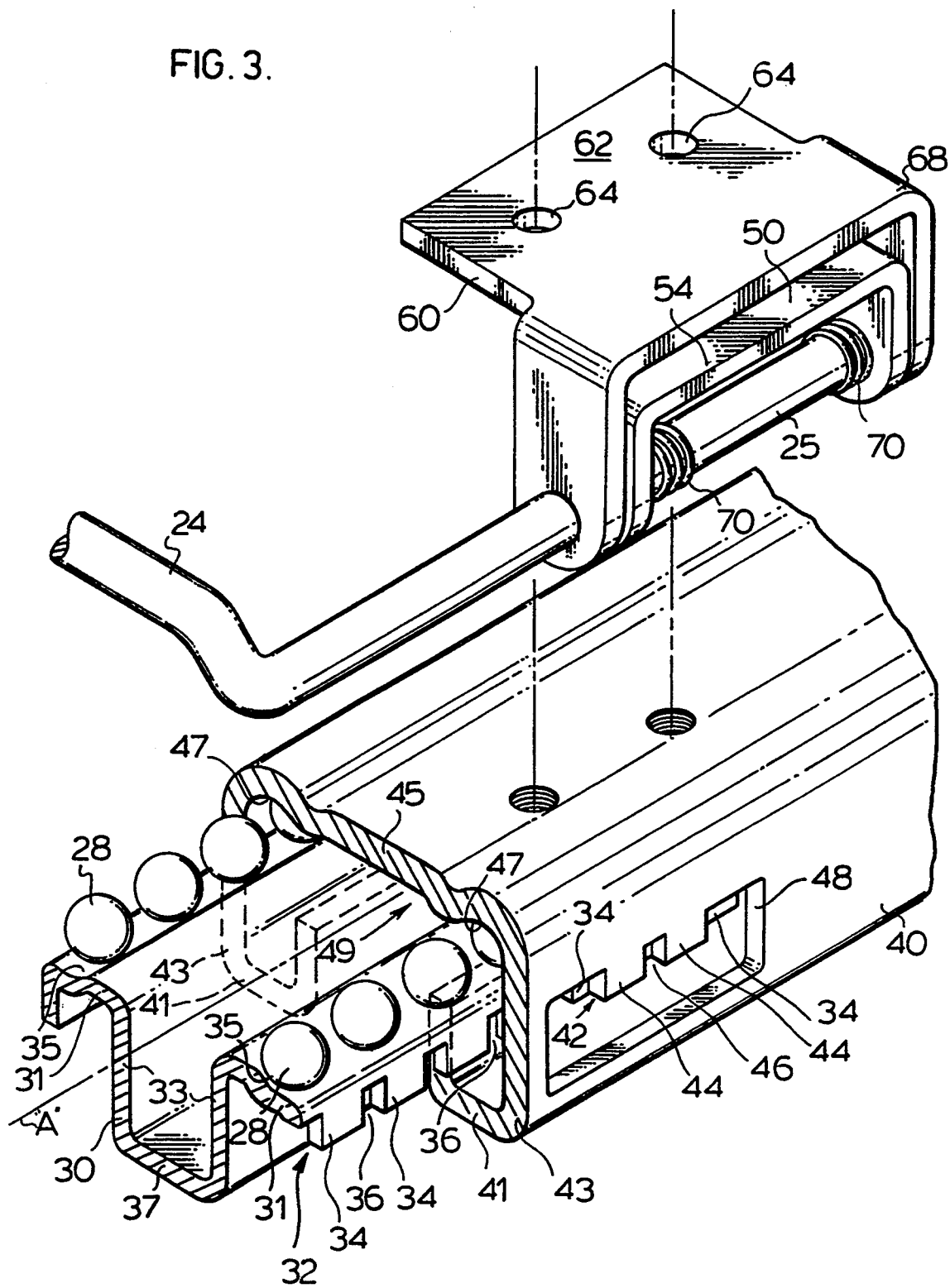
Figure 6:
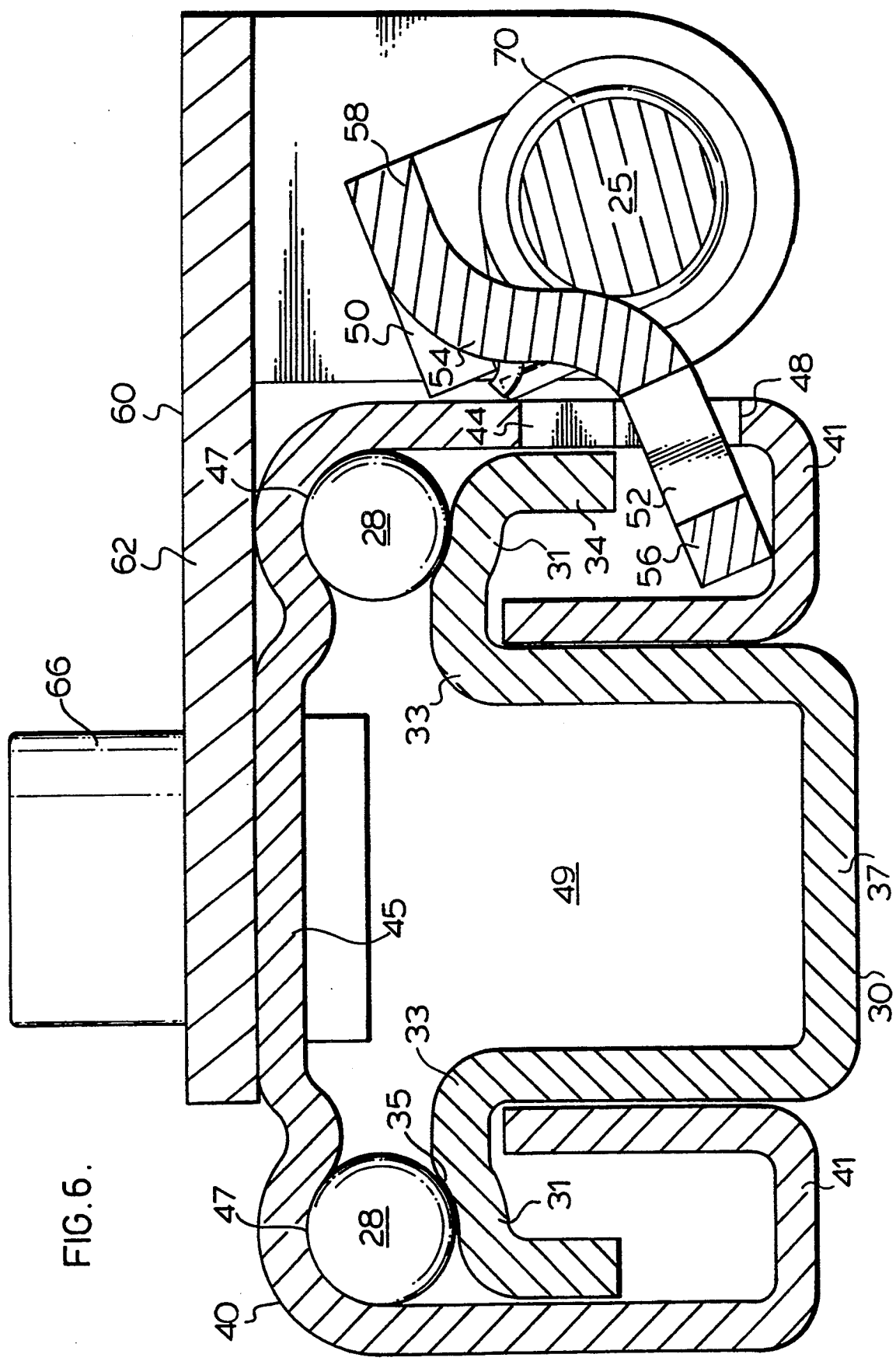

FIG. 1 of the drawings appended hereto is a perspective view of a preferred embodiment of a latchable track assembly according to the present invention mounted in conjunction with a vehicle seat;

FIG. 2 of the drawings is a perspective view of a portion of the latchable track assembly of FIG. 1;

FIG. 3 of the drawings is an exploded perspective view of a portion of the latchable track assembly of FIG. 1, including the portion shown in FIG. 2;

FIG. 4 off the drawings is a perspective cut-away view of a portion of the latchable track assembly shown in FIG. 3, in an assembled configuration;

FIG. 5 of the drawings is sectional view of the latchable track assembly of FIG. 1, taken along section line 5—5 of FIG. 1, with the locking member shown in a latched configuration; and, FIG. 6 is a sectional end view similar to FIG. 5, with the locking member shown in an unlatched configuration.

Referring now to FIG. 1 of the drawings, a latchable track assembly, designated by the general reference numeral 20, is shown for use with a seat 22 in a vehicle (not shown). A handle means 24 extends forwardly from the latchable track assembly 20, so as to allow a seat occupant to selectively actuate the latchable track assembly 20.

The latchable track assembly 20 includes a first track member 30 and a second track member 40 that are slidably engaged with each other so as to be adapted for relative sliding movement with respect to each other along a first longitudinal axis "A" (see FIG. 3). The first track member 30 is securely affixed to the floor pan of a vehicle (not shown) by way of support legs 26,26 and known fastening means such as bolts 29. The support legs 26,26 are welded or otherwise affixed to the underside of a central portion 37 of the first track member 30. The second track member 40 is conventionally affixed to the bottom of seat 22 by known fastening means such as bolts or screws (not shown). The first 30 and second 40 track members are each generally U-shaped in cross-section and face each other so as to form a generally enclosed space, designated by the general reference numeral 49. A vehicle seat track assembly of the general type having utility in relation to the preferred embodiment described herein now is more fully disclosed in U.S. Pat. No. 4,863,286 (Lecerf), issued Sep. 5, 1989.

The first track member 30 has a pair of outwardly directed flanges 31 extending generally horizontally from the top portion 33 thereof. Each of the outwardly directed flanges 31 has a race 35 therein for receiving a plurality of ball bearings 28, along at least a portion of the length thereof. Extending downwardly from the outer portion of one of the outwardly directed flanges 31 is a first row, designated by the general reference numeral 32, of consecutive teeth 34, which teeth 34 are retained within the generally enclosed space 49. The first row 32 of consecutive teeth 34 is in aligned, generally parallel relation to the first axis "A". The consecutive teeth 34 define interstices 36 positioned one between each pair of consecutive teeth 34.

The second track member 40 has a pair of inwardly directed flanges 41 extending inwardly from the bottom portion 43 thereof. The top portion 45 has a pair of races 47 formed therein for receiving the ball bearings 28. The ball bearings 28 act as an interface between the first track member 30 and the second track member 40 and allow the first 30 and second 40 track members to be easily slidably moveable with respect to each other.

The second track member 40 has an opening 48 therein. Extending downwardly from the top of the opening 48 is a second row, as designated by the general reference numeral 42, of consecutive teeth 44. The second row 42 of consecutive teeth 44 is also in aligned, generally parallel relation to the first axis "A". The consecutive teeth 44 define interstices 46 positioned one between each pair of consecutive teeth 44.

There is also provided according to the present invention a locking member 50 extending into the opening 48, which locking member 50 is used to selectively retain the first track member 30 and the second track member 40 in fixed longitudinal relation with respect to each other. The locking member 50 has a plurality of generally horizontally oriented detent portions 52, wherein the detent portions 52 are selectively positionable into and out of the interstices 36,46 of both the first 30 and second 40 track members. The detent portions 52 are dimensioned to be positionable one each within the interstices 36,46 of the first 30 and second 40 track members in transverse intruding relation to the first row 32 of consecutive teeth 34 and the second row 42 of consecutive teeth 44. The detent portions 52 join an upwardly sweeping ramped portion 54 at their inner ends 52a, which ramped portion 54 merges with a C-shaped mounting portion 58 of the locking member 50.

The detent portions 52 are preferably joined one to another at their other opposite ends 52b by a spanning portion 56 so as to add extra strength to the latching mechanism in the latched configuration in order to better resist the shearing forces generated under crash or crash-like conditions of vehicle deceleration or acceleration.

The C-shaped mounting portion 58 receives an axle portion 25 of the handle means 24 in generally secured unmoving interconnection through circular mounting holes 51. The mounting portion 58 and the axle portion 25 are preferably welded together for mutual rotation in order to provide a strong secure interconnection, although various other means of attachment have acceptable utility.

The openings 53 in the locking member 50 surrounding the centrally located of the detent portions 52 are larger than other openings 55 in the locking member 50 so as to each accommodate one tooth from the first row 32 of consecutive teeth and also one tooth from the second row 42 of consecutive teeth.

A bracket member 60 is also provided, which bracket member comprises a generally planar attachment portion 62 and a C-shaped receiving portion 68. The bracket member 60 is rigidly attached to the second track member 40 by bolts 66 (one only of which is shown in FIGS. 4 and 6) that are received in bolt holes 64 that are formed in the generally planar attachment portion 62. The bracket member 60 is adapted to laterally support the locking member 50 in juxtaposed pivotable relation to the first row 32 of teeth 34 on the first track member 30 for pivoting movement about a second longitudinal axis "B" (see FIG. 4) that is substantially parallel to the first longitudinal axis "A".

The C-shaped receiving portion 68 is adapted to receive therein the C-shaped mounting portion 58 of the locking member 50 and also adapted to receive in freely pivotable relation the axle portion 25 of the handle means 24 within a pair of aligned circular mounting holes 61 in the downwardly turned portions of the C-shaped receiving portion 68. The locking member 50 is thereby mounted on the bracket member 60 in pivotable relation thereto. The locking member 50 and the bracket member 60 together form a latching mechanism, as designated by the general reference numeral 70.

A pair of biasing springs 72 are mounted around opposite ends of the axle portion 25 to bias the locking member 50, such that the detent portions 52 are biased upwardly, as shown by arrow "C" of FIG. 2, into the interstice 36,46. Thus, the detent portions 52 are selectively positionable into and out of the interstices 36,46, and move into and out of the interstices 36,46 in a plane substantially transverse to the first longitudinal axis "A" thereby to selectively retain the first 30 and second 40 track members in fixed longitudinal latched relation with respect to each other. The detent portions 52 are selectively positionable by the seat occupant by manipulation of the handle means 24 so as to allow the seat occupant to selectively actuate the locking member 50.

The latchable track assembly 20 of the present invention operates in the following manner, having a latched configuration as best shown in FIG. 5 and an unlatched configuration as best shown in FIG. 6. In the latched configuration, the first 30 and second 40 track members are selectively retained in fixed longitudinal latched relation with respect to each other, which resultingly keeps the seat 22 in fixed relation within the vehicle (not shown). In such latched configuration, at least some of the interstices 36 of the first row 32 of consecutive teeth 34 are aligned with a corresponding number of interstices 46 of the second row 42 of consecutive teeth 44 so as to establish a corresponding number of pairs of aligned interstices 36,46. The detent portions 52 are selectively positionable into and out of these pairs of aligned interstices 36,46 by operation of the handle means 24.

To go from the latched configuration to the unlatched configuration, or vice versa, the handle means 24 is used to pivot the locking member 50 around the second longitudinal axis "B" Correspondingly, the detent portions 52 are pivotally moved around the second longitudinal axis "B" into and out of the pair of aligned interstices 36,46 in a plane (indicated by arrow "C" of FIG. 2) which is substantially transverse to the first longitudinal axis "A" and the second longitudinal axis "B".

In an unlatched configuration, the detent portions 52 are pivotally moved out of the pairs of aligned interstices 36,46 so that the first 30 and second 40 track members are no longer selectively retained in fixed longitudinal latched relation with respect to each other. In the unlatched configuration, the seat occupant is free to slide the seat 22 to any position wherein some of the interstices 36 of the first track member 30 are aligned with a corresponding number of interstices 46 of the second track member 40. By releasing the handle means 24 when such alignment is realized, the detent portions 52 will enter the pairs of aligned interstices 36,46 under the biasing of the springs 70,70 in the direction of arrow "C" so as to retain the first 30 and second 40 track members in fixed longitudinal latched relation with respect to each other.

In an alternative embodiment of the present invention (not shown), it is contemplated that the locking member could be moveable toward and away from the teeth of the first and second track members in a linearly translatable manner. This could be accomplished by mounting the locking member on two or more elongated guide pins rigidly attached to the bracket members and oriented transversely to and directed at the first and second rows of teeth on the first and second track members. The detent portions of the locking member slidably engage the guide pins so as to be adopted to move in a plane substantially transverse to the first longitudinal axis of the first and second track members into and out of the pairs of aligned interstices 36,46 upon activation of suitable linkage means attached to a control handle.

In a further alternative embodiment, it is contemplated that the second row of consecutive teeth is omitted as they are not strictly necessary in order to retain the first and second track members in fixed longitudinal latched relation with respect to each other. Exclusion of the second row of teeth, will, however, reduce the total shear strength of the overall latching mechanism in terms of resisting longitudinal forces and further precludes having a secondary means of retaining the first and second track members in fixed longitudinal relation by way of the detent portions in the event that the bracket member becomes detached from the second rail member.

It is to be understood that while certain forms of the present invention have been illustrated and described herein, it is not to be limited to the specific forms or arrangement of parts described and shown.

I claim:

1. A latchable track assembly for use with a seat in a vehicle, said assembly comprising:

first and second slidably engaged track members adapted for relative sliding movement with respect to each other along a first longitudinal axis, with said first track member being secured to said vehicle and said second track member being supported in slidable engagement by said first track member;

said first track member having a first row of consecutive teeth on said first track member with said first row of consecutive teeth in aligned, generally parallel relation to said first axis, said consecutive teeth defining interstices positioned one between each pair of said consecutive teeth;

said second track member having a second row of consecutive teeth on said second track member with said second row of consecutive teeth in aligned, generally parallel relation to said first axis, said consecutive teeth defining interstices positioned one between each pair of said consecutive teeth;

wherein said first and second track members are each generally U-shaped and when in place in said vehicle form a generally enclosed space therebetween, with said first track member being substantially enclosed by said second track member;

wherein at least some of said interstices of said first row of teeth are alignable with a corresponding number of said interstices of said second row of teeth so as to establish a corresponding number of pairs of aligned interstices;

a locking member comprising a plurality of detent portions extending outwardly from the locking member and rigidly joined to one another at their respective outer ends by a spanning portion, the detent portions being dimensioned to be positionable within at least two of said corresponding pairs of aligned interstices in transverse intruding relation to said first row of consecutive teeth;

a bracket member rigidly attached to said second track member and adapted to laterally support said locking member in juxtaposed relation to said first track member; and, wherein said locking member is mounted on said bracket member such that said detent portions are selectively movable into and out of said aligned interstices in a plane substantially transverse to said first longitudinal axis by corresponding selective operation of said locking member, thereby to selectively retain said first and second track members in fixed longitudinal latched relation with respect to each other; and, wherein said teeth of said first track member are retained within said generally enclosed space, and said spanning portion is at all times also retained within said enclosed space.

2. The latchable track assembly of claim 1, wherein said bracket member is adapted to support said locking member in juxtaposed relation to said first track member for pivotal movement about a second longitudinal axis that is substantially parallel to said first longitudinal axis.

3. The latchable track assembly of claim 2, wherein said teeth and said interstices of said first track member are disposed generally downwardly and said detent portions of said locking member move generally vertically into and out of said interstices.

4. The latchable track assembly of claim 3, wherein said detent portions are oriented generally horizontally in the latched configuration of the track assembly.

5. The latchable track assembly of claim 4, wherein said locking member is spring biased such that said detent portions are biased toward said interstices.

6. The latchable track assembly of claim 5, further comprising a handle means securely attached to said locking member to allow a seat occupant to selectively actuate said locking member.

7. The latchable track assembly of claim 6, wherein said handle means extends outwardly from the side of said seat.

8. The latchable track assembly of claim 6, wherein said handle extends outwardly from the front of said seat.

9. The latchable track assembly of claim 8, wherein said first track member is securely affixed to said vehicle and said second track member is securely affixed to said seat.

10. The latchable track assembly of claim 1, wherein said interstices between said teeth in said first and second rows of consecutive teeth extend the length of each of said teeth so that each of said teeth has individually a free end distal to the respective said first and second track members.

11. The latchable track assembly of claim 1, wherein said teeth in said first and second rows of consecutive teeth are an integral part of the respective of said first and second track members.

* * * * *